(12) United States Patent
Levin et al.

(10) Patent No.: US 7,449,799 B2
(45) Date of Patent: Nov. 11, 2008

(54) HARMONIC MITIGATING DEVICE WITH MAGNETIC SHUNT

(75) Inventors: Michael I. Levin, Downsview (CA); Anthony H. Hoevenaars, Aurora (CA); Igor V. Volkov, Kiev (UA)

(73) Assignee: 1061933 Ontario Inc., North York, Ontario (CA)

( * ) Notice: Subject to any disclaimer, the term of this patent is extended or adjusted under 35 U.S.C. 154(b) by 349 days.

(21) Appl. No.: 11/068,798

(22) Filed: Mar. 2, 2005

(65) Prior Publication Data

US 2006/0197385 A1 Sep. 7, 2006

(30) Foreign Application Priority Data

Mar. 1, 2005 (CA) .................................. 2498993

(51) Int. Cl.
*H02J 1/02* (2006.01)
*H01F 27/24* (2006.01)
(52) U.S. Cl. ........................ 307/105; 336/212
(58) Field of Classification Search ............... 307/105; 336/212
See application file for complete search history.

(56) References Cited

U.S. PATENT DOCUMENTS

| | | | |
|---|---|---|---|
| 6,127,743 A | 10/2000 | Levin et al. | |
| 6,339,265 B1 | 1/2002 | Levin et al. | |
| 6,856,230 B2 * | 2/2005 | Lu | 336/212 |
| 6,873,239 B2 * | 3/2005 | Decristofaro et al. | 336/178 |
| 7,027,279 B2 * | 4/2006 | Levin et al. | 361/58 |
| 7,142,081 B1 | 11/2006 | Shudarek | |

* cited by examiner

*Primary Examiner*—Stephen W Jackson
*Assistant Examiner*—Michael Rutland Wallis
(74) *Attorney, Agent, or Firm*—Dimock Stratton LLP; Mark B. Eisen

(57) ABSTRACT

A harmonic mitigating device for connection between a power distribution system and the load uses a magnetic shunt to control the levels of magnetic coupling between different elements of the device while providing all windings on a single core. This allows for the reduction or elimination of the harmonic MMF induced in the line winding of the device, and as a result the reduction of harmonic currents flowing into the power supply system; and the reduction of the line winding inductance, which in turn reduces the voltage boost of the device under the no-load conditions, reduces the voltage drop at full load conditions and increases the stability of the drive. The invention serves to reduce ripple level in rectifier outputs and buffers transient overvoltages, and a single configuration works with any rectifier type, including SCR bridges.

9 Claims, 5 Drawing Sheets

HARMONIC MITIGATING DEVICE WITH MAGNETIC SHUNT

FIELD OF INVENTION

This invention relates to harmonic mitigating devices for electrical power distribution systems. In particular, this invention relates to a solid state passive harmonic mitigating device for connection between the power distribution system and one or more harmonic-generating loads, to reduce the levels of harmonic currents flowing into the power distribution system.

BACKGROUND OF THE INVENTION

Electrical distribution systems, for example for distributing an electrical power supply through a building or industrial facility, are often subjected to harmonic currents generated by non-linear loads such as electronic equipment (including computers, adjustable speed drives (ASD), uninterruptable power supplies (UPS), power rectifiers, etc.) and equipment that uses different kinds of arc processes (including arc discharge lighting systems). These harmonic-generating loads generate various levels of conventional harmonics (5th, 7th, 11th, 13th, 17th, 19th, 23rd, 25th etc.) and, for single phase line-to-neutral non-linear loads, also zero phase sequence or "triplen" harmonics (3rd, 9th etc.) in the power distribution system, the harmonic spectrum depending upon the nature of the harmonic-generating load.

These harmonic currents create many problems in the power distribution system, including increased voltage total harmonic distortion level, reduced electromagnetic compatibility of the loads, reduced reliability of the power distribution equipment, increased power losses, reduced power factor, and other problems which are well known to those skilled in the art.

Prior art systems for mitigating harmonic currents fall into six basic types:

1. Power factor corrected (PFC) power supplies: In these systems the rectified current is continually adjusted to smooth the current consumption waveform. PFC's are relatively expensive devices and their applications are limited. Also, PFC's cannot be retrofitted for use with existing power supplies, and are not practical for use with large ASD's.

2. Active filters: These devices inject into the conductors between the power distribution system and the load, harmonic currents having a polarity opposite to those generated by the load, thereby neutralizing harmonic currents flowing into the power distribution system. Active filters have many disadvantages, including high cost, poor reliability. Active filters also are not practical for use with large ASD's.

3. Resonant L-C filters: L-C filters are commonly used in power systems, tuned to different harmonic frequencies to mitigate specific harmonic currents. These devices present many problems which are well known to those skilled in the art, including high cost and the tendency to cause the system to operate with a leading power factor. Further, because L-C filters are non-directional they are easily overloaded by untreated harmonic currents generated by other harmonic sources connected to the power distribution system (for example in a neighboring facility), resulting in overloading and frequent failures of the filter's capacitor bank.

4. AC chokes: In this harmonic mitigating technique reactors are connected in series between the line and the load. This technique is simple, reliable and relatively low cost, however it results in a high voltage drop across the reactors. To reduce the voltage drop one must reduce the choke reactance level, which commensurately reduces the effectiveness of the choke and substantially limits harmonic current mitigation.

The voltage can be boosted by connecting a capacitor bank between the load and the choke, but this frequently causes the system to operate with a leading power factor (especially in the case of light loading). In this case, since the reactance of the reactor at harmonic frequencies is much higher than the reactance of the reactor at the fundamental frequency, a large part of the harmonic currents drain through the capacitor. The capacitor has a high reactance at the fundamental frequency. However, the voltage drop across the choke remains very high. Thus, large compensating capacitors must be connected between the load and the choke to boost the voltage, which substantially increases the size and cost of the system and causes the system to operate at increased voltage levels during light loading conditions.

5. Phase shifting systems: Different kinds of phase shifters are available which allow the creation of quasi-multiphase systems, reducing certain harmonic levels. Harmonic currents of targeted orders are cancelled or substantially reduced depending upon the selected degree of the phase shift. However, such systems are typically limited in terms of the number of harmonic orders which can be mitigated, and the degree of harmonic mitigation depends upon the extent to which harmonics produced by the various harmonic sources are identical.

6. Passive wide-band filters, for example as described in U.S. Pat. No. 6,127,743 issued Oct. 3, 2000 to Levin et al., which is incorporated herein by reference and illustrated in FIG. 1 herein. This filter consists of a multiple winding reactor and a capacitor bank. This filter comprises a blocking coil (line winding 20 in FIG. 1) and filtering component comprising inductive and capacitive elements in a crosslink circuit. The filter described and illustrated in U.S. Pat. No. 6,127,743 is effective in eliminating a wide range of harmonics from the system.

However, since all inductive elements of the filter in U.S. Pat. No. 6,127,743 are wound on a common magnetic core, there is magnetic coupling between the various inductive elements of the filter. The harmonic currents flowing in the cross-link circuit generate a magneto motive force (MMF), and as a result of magnetic coupling between the blocking element of the filter (the line winding) and the cross-link circuit, the magneto-motive force (MMF) induces harmonic currents in the blocking element that flow directly into the power supply system, increasing the total harmonic current flowing into the power supply system and thereby reducing the effectiveness of harmonic mitigation by the filter.

Thus, in this solution, as more harmonic currents are diverted by the blocking element through the cross-link circuit, a greater MMF is generated and a higher level of harmonic current is thereby induced in the blocking element. With these additional harmonic currents, in order to improve filter performance to the required level the impedance level of the blocking element must be substantially increased. This causes a substantial voltage boost under no-load conditions, increased voltage drop at full load conditions, and sometimes drive stability problems especially when driving high-inertia loads. Also, different filter configurations have to be used for 1) rectifiers (drives) with no reactors; 2) rectifiers with DC line reactors; and 3) rectifiers with AC line reactors.

The sets of windings could alternatively be wound on separate cores, however there is a high cost to this both in materials used and in the space occupied by a multiple-core device (known as the 'footprint').

SUMMARY OF THE INVENTION

The present invention overcomes these disadvantages by providing a harmonic mitigating device for connection between the power distribution system and the load, which allows control over the levels of magnetic coupling between different elements of the device while providing all windings on a single core. Control over magnetic coupling is accomplished through the use of magnetic shunts. This allows for the reduction or elimination of the harmonic MMF induced in the line winding of the device, and as a result the reduction of harmonic currents flowing into the power supply system. This further allows for the reduction of the line winding inductance, which in turn reduces the voltage boost of the device under the no-load conditions, reduces the voltage drop at full load conditions and increases the stability of the drive. The invention serves to reduce ripple level in rectifier outputs and buffers transient overvoltages, and a single configuration works with any rectifier type, including SCR bridges.

The present invention thus provides a harmonic mitigating device for mitigating harmonic currents generated by a load having an input connected to a power distribution system and an output connected to the load, comprising a magnetic core having three core legs, each corresponding with one of three phases of the power distribution system, a magnetic shunt, extending across and magnetically coupled to the core legs at an intermediate part thereof, such that first and second parts of the core on either side of the shunt, for each phase, a first reactive element comprising a line winding having a first end for connection to a first line and a second end, the line winding being disposed on the first part of the core, for each phase, a second reactive element comprising a first cross-link winding, disposed on the second part and having a first end connected to the second end of the line winding and a second end connected to a capacitor, the capacitor having a second end connected to a different phase or to a capacitor associated with a different phase, whereby the line winding and associated cross-link winding for each phase are magnetically coupled by the magnetic shunt.

The invention further provides a harmonic mitigating device for mitigating harmonic currents generated by a load having an input connected to a power distribution system and an output connected to the load, comprising a magnetic core having at least one core leg, the core comprising a first part and a second part a magnetic shunt, the first and second parts of the core being disposed on either side of the shunt, a first reactive element comprising a line winding having a first end for connection to a first line of a power supply and a second end, the line winding being disposed on the first part of the core, a second reactive element comprising a cross-link winding, disposed on the second part of the core and having a first end connected to the second end of the line winding and a second end connected to a capacitor, the capacitor having a second end connected to a second line of the power supply, whereby the line winding and associated cross-link winding are magnetically coupled by the magnetic shunt.

The invention further provides a magnetic system, comprising a magnetic core having at least a first portion and a second portion, the first and second portions being separated by a magnetic shunt.

In further embodiments of the invention the core is provided with at least one non-magnetic gap.

IN THE DRAWINGS

In drawings which illustrate by the way of example only a preferred embodiment of the invention, FIG. 1 is a circuit diagram of a prior art passive wide-band filter.

Figure 7:
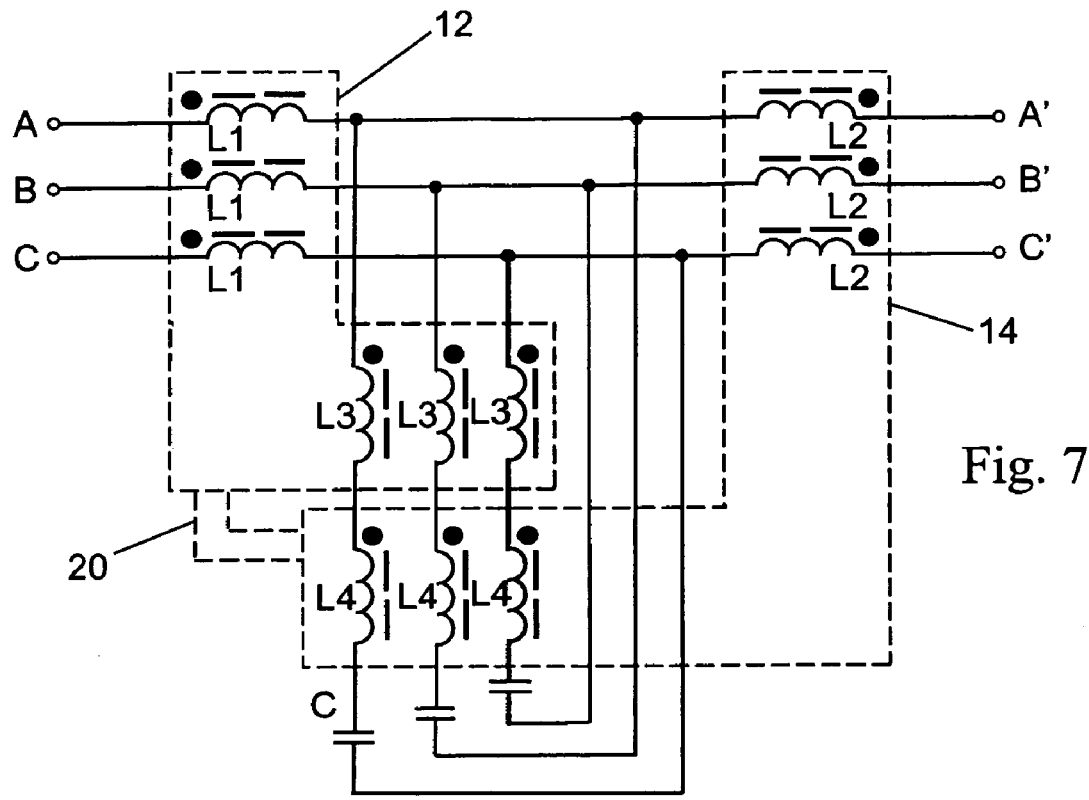

FIG. 7 is a schematic diagram of a further preferred three-phase embodiment of the invention having two windings in each phase of the cross-link circuit, with the input windings and one set of cross-link windings disposed on one side of the magnetic shunt and the output windings and the other set of cross-link windings disposed on the other side of the magnetic shunt, and cross-link circuits connected line-to-line.

Figure 8:
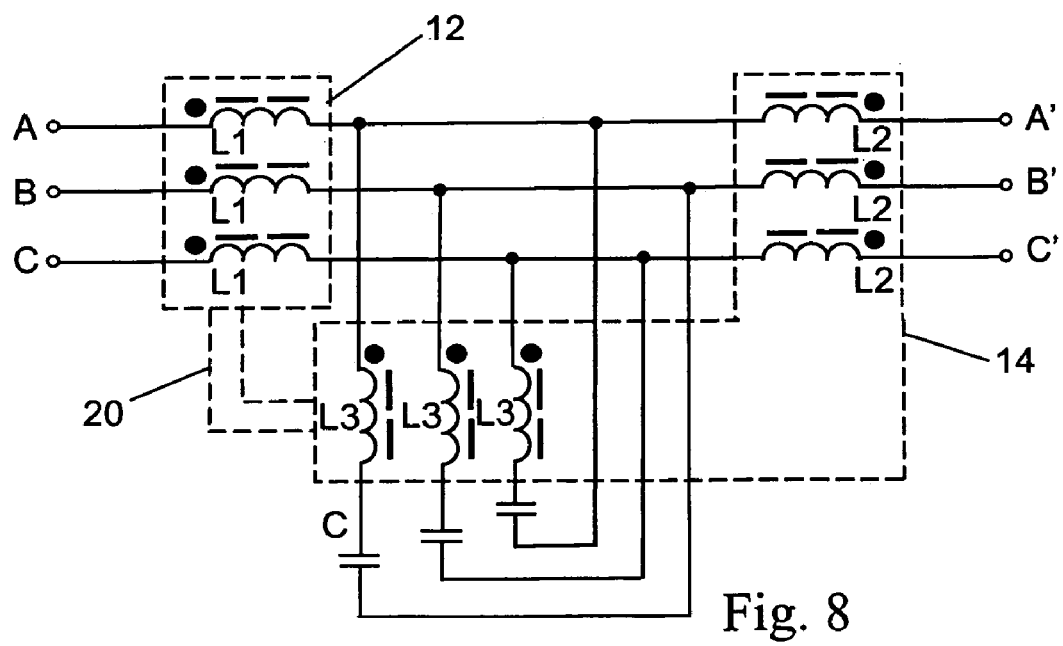

FIG. 8 is a schematic diagram of a further preferred three-phase embodiment of the invention having one winding in each phase of the cross-link circuit, with the input windings and one set of cross-link windings disposed on one side of the magnetic shunt and the output windings and the other set of cross-link windings disposed on the other side of the magnetic shunt, and cross-link circuits connected line-to-line.

Figure 9:
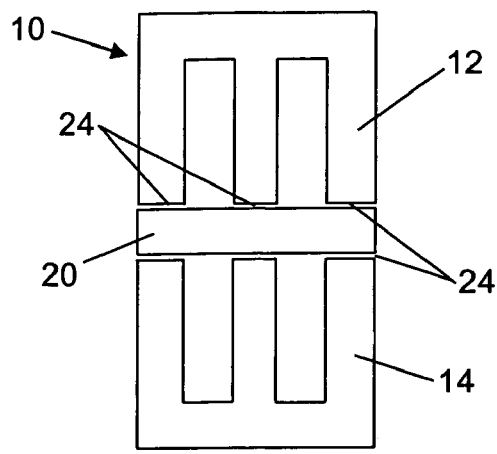

FIG. 9 is a schematic diagram of a core for the invention having a magnetic shunt between the input and the output sections of the core, with two windings in each section.

Figure 10:
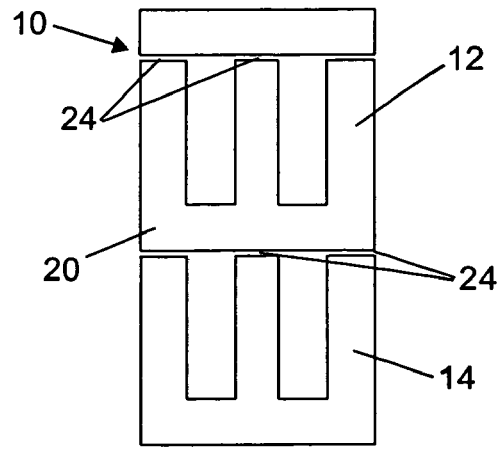

FIG. 10 is a schematic diagram of a core for the invention having the bottom yoke of one of the input and output sections of the core serving as a magnetic shunt between the input and the output sections, with two windings in each section.

Figure 11:
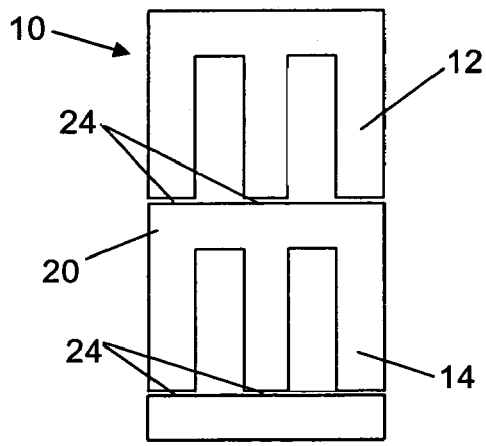

FIG. 11 is a schematic diagram of a core for the invention having the top yoke of one of the input and output sections of the core serving as a magnetic shunt between the input and the output sections, with two windings in each section.

Figure 12:
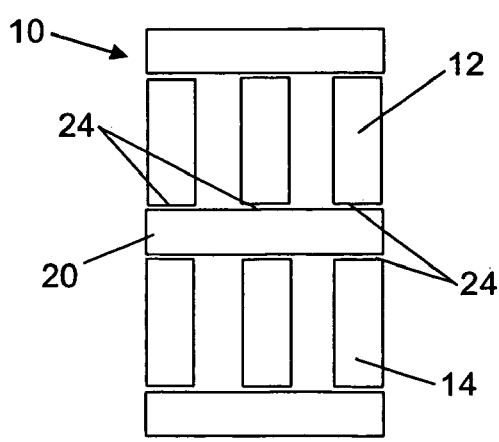

FIG. 12 is a schematic diagram of a core for the invention with multiple non-magnetic gaps at the yoke and shunt connections.

Figure 13:
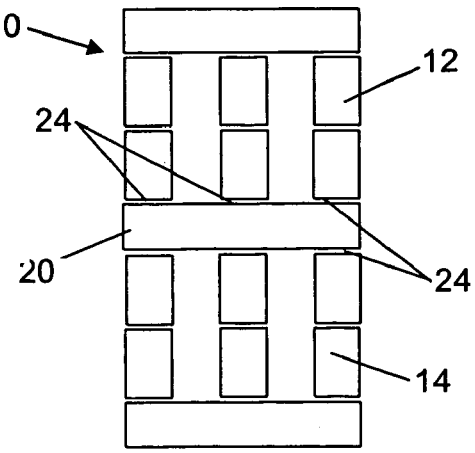

FIG. 13 is a schematic diagram of a core for the invention with multiple non-magnetic gaps, including distributed air gaps.

DETAILED DESCRIPTION OF THE INVENTION

The harmonic mitigating system of the invention may utilized in a multi-winding reactor having a capacitor bank, similar to that described and illustrated in U.S. Pat. No. 6,127,743 issued Oct. 3, 2000 to Levin et al., which is incorporated herein by reference and illustrated in FIG. 1. In the embodiments of the invention illustrated and described hereafter, the power distribution system 2 may be any AC electrical power source, typically a mains power supply powered by an electrical utility or a local generator. The load 4 typically includes one or more harmonic generating (non-linear) loads, the most common being non-linear loads such as adjustable speed drives, rectifiers etc. The harmonic spectrum of different types non-linear loads may vary, however the device of the invention is suitable for mitigating harmonic currents generated by many different kinds of harmonic generating loads.

Figure 1:
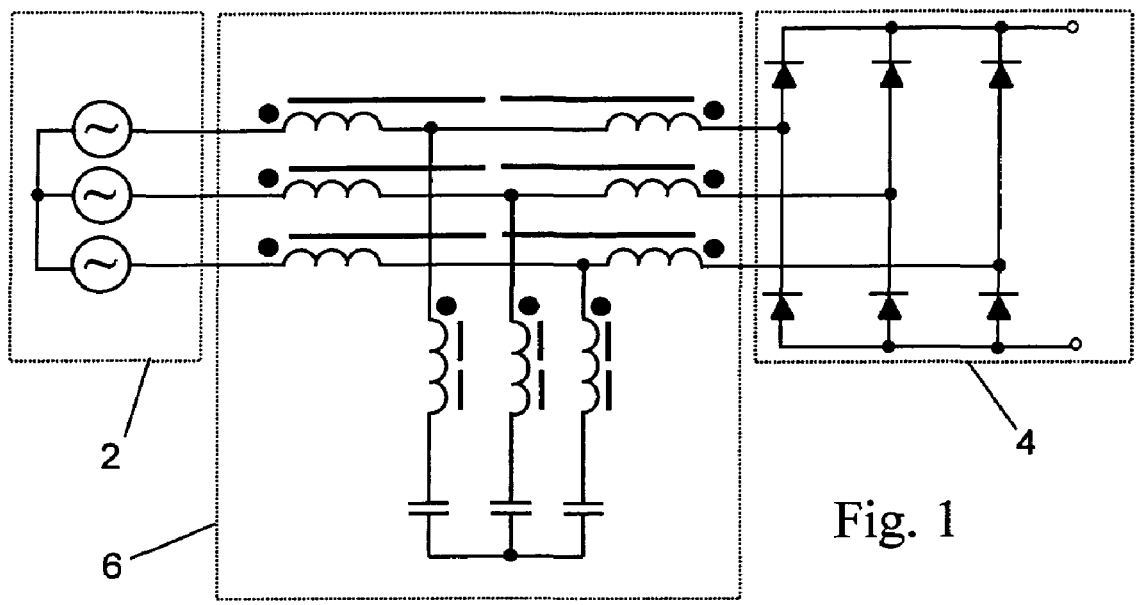

In the prior art harmonic mitigating system 6 illustrated in FIG. 1, described in U.S. Pat. No. 6,127,743, harmonic currents generated by the load 4 are mitigated by interposing reactive elements in the three phases of the power distribution system between the power distribution system 2 and the load 4, to establish a fundamental current path between the load and the power distribution system 2. The cross-link circuit, comprising a three phase capacitor bank, may be connected in Delta or/and Wye configurations and connected between the phases to establish low reactance path for harmonic currents generated by the load 4. Harmonic currents, which according to fundamental electrical principals will primarily follow the path of lowest reactance, are thus largely diverted from the power distribution system 2 through the cross-link circuit and do not penetrate into the power distribution system 2.

The harmonic mitigation device of the invention improves harmonic mitigation in a system such as that illustrated in FIG. 1 by controlling the extent of magnetic coupling between the cross-link windings L3, through which harmonic currents are diverted from the power system, and the line windings L1.

Figure 2:
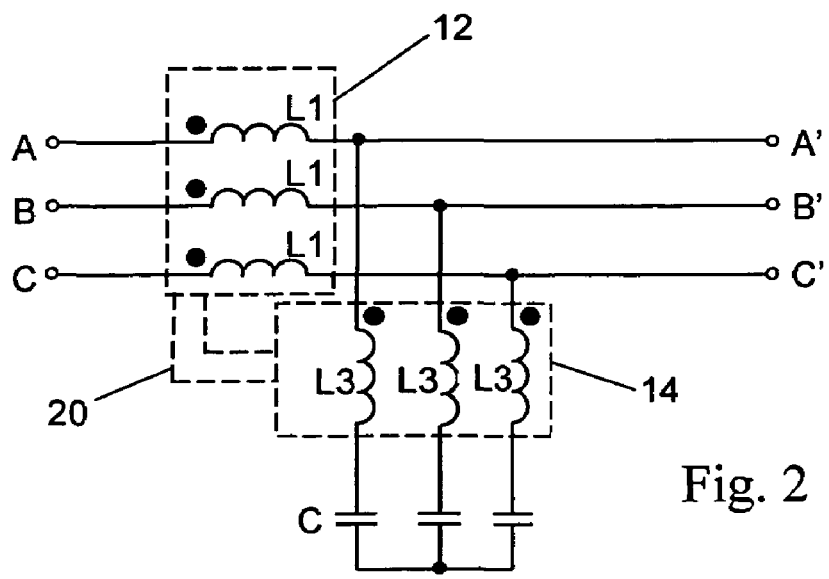
FIG. 2 is a first preferred embodiment of three-phase harmonic mitigating device embodying the invention having in each phase an input winding and a cross-link winding on a magnetic core, separated by a magnetic shunt.

A first preferred embodiment of the invention, having inputs A, B and C for connection to the power supply (not shown) and outputs A', B' and C' for connection to the load (not shown), is illustrated in FIG. 2. According to the preferred embodiment, control over the extent of magnetic coupling between the cross-link windings L3 and the line windings L1 is accomplished by providing for each phase at least one line winding, for example an input winding L1, disposed on first part 12 of a magnetic core 10, and at least one cross-link winding L3 disposed on an second part 14 of a magnetic core 10, the first part 12 and second part 14 being separated from one another by a magnetic shunt 20 (the parts 12, 14 of the core 10 and the shunt 20 are shown in dashed lines). The polarity of the windings L1, L3 induces magnetic fluxes that may add (if in the same direction) or partially cancel (if in opposite directions) in the magnetic shunt 20.

In the preferred embodiments of the invention the magnetic core is formed from two magnetic parts 12, 14 separated by the magnetic shunt 20 (see for example FIGS. 9 to 13), although the core 10 may have more than two parts 12, 14 and more than one shunt 20 and the principles of the invention will apply equally. The magnetic shunt 20 may be viewed as a shared yoke, which conducts magnetic flux generated by the windings on either side of the shunt 20 and, by arranging the windings in a selected relative polarity, to partly or fully cancel the opposing magnetic fluxes in the magnetic shunt 20.

The ferrous core 10 should preferably be provided with at least one non-magnetic gap 24, since the magnetic characteristics of ferrous materials are nonlinear and vary widely with the load current. With a completely solid ferrous core it would be virtually impossible to control the reactance characteristics of the core 10, because reactance would change drastically as the load current changes. The non-magnetic gap 24 magnetically decouples the output winding L2 and the cross-link winding L3. The optimal gap size changes depending upon the rating of the device, influenced primarily by the cross-section of the core and the number of turns of the windings. The gap 24 also allows for large levels of power flow to be conducted through the reactor. The non-magnetic gaps may be air gaps obtained by physically separating the parts of the core 10, or may be formed from any suitable non-magnetic material interposed between parts of the core 10.

The desired inductances and separation between the parts 12, 14 of the magnetic core 10 are achieved by appropriate selection of the non-magnetic gaps 24 in terms of both number and size. Each part of the magnetic core 10 should preferably be provided with at least one non-magnetic gap 24 in each core leg 10a, 10b, 10c. The optimal gap size and quantity of the gaps 24 changes depended upon rating of the device. For example, in a reactor for a 600 horsepower, 480 Volt drive the part of the core 10 containing the cross-link circuits should have four non-magnetic gaps 24 of 0.159" (4.0 mm) each, while the part of the core 10 containing the line windings L1 (and optionally L3, L4) should have five non-magnetic gaps 24 of 0.095" (2.4mm) each. The optimum gap number and size can be obtained through experimentation and/or computer modeling.

Figure 3:
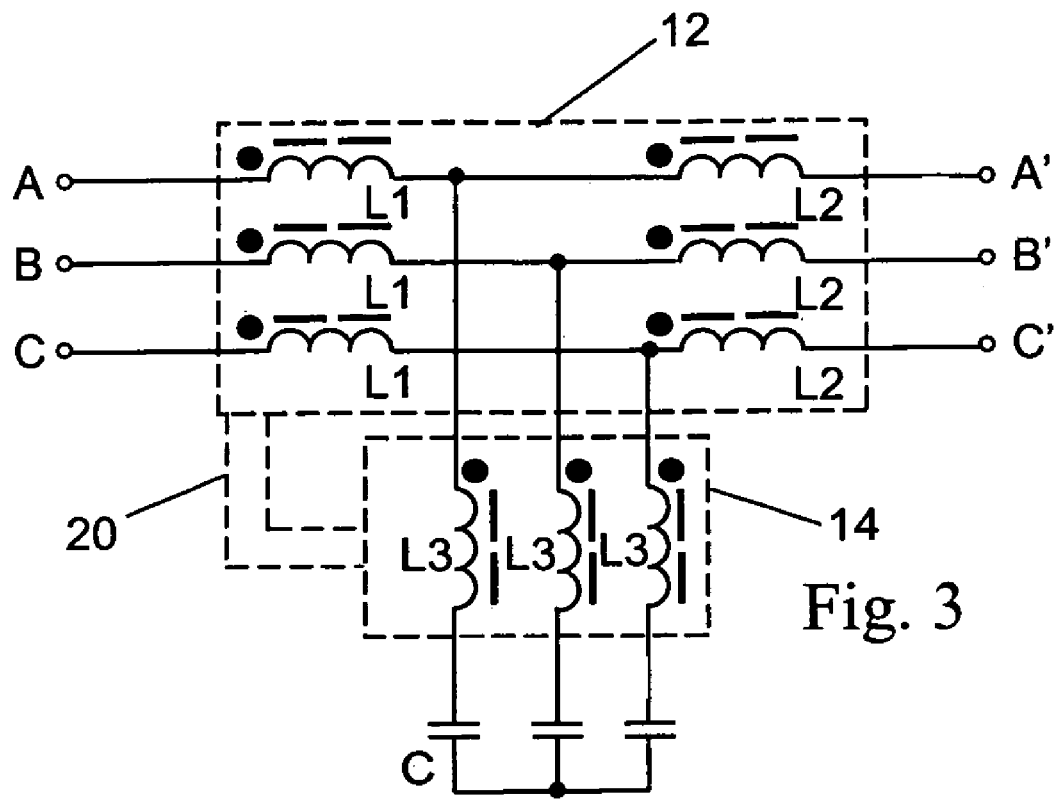
FIG. 3 is a schematic diagram of a further preferred three-phase embodiment of the invention on a magnetic core having in each phase an input winding, an output winding and a cross-link winding, with input and output windings disposed on one side of a magnetic shunt and the cross-link windings disposed on the other side of the magnetic shunt.

A further preferred embodiment of the invention illustrated in FIG. 3 has an output winding L2 connected in series with the input winding L1 and disposed on the same part (first part 12) of the core 10 as the input winding L1. The L2 winding of the invention may have the same or opposite polarity as the L1 winding. The cross-link winding L3 is disposed on the other side of the shunt 20, on the second part 14 of the core 10, and its polarity is opposite the combined polarities (i.e. direction of the net flux) of the line windings L1, L2. The flux separation between the second part 14 and the first part 12 of the core 10 substantially eliminates the harmonic MMF generated in the first part 12 of the reactor by windings L1 and L3.

Optimization of the harmonic mitigating performance of the invented device with the other parameters such as the device desired output voltage boost at no-load conditions, desired output voltage drop at full load conditions, system operation stability etc., can be achieved by computer modeling and/or experimentation to determine the optimal inductances of windings L1, L2 and L3 and the capacitance of the capacitor bank C. Depending on the device configuration, the computer modeling should include coupling coefficients or mutual inductances between different windings.

Figure 4:
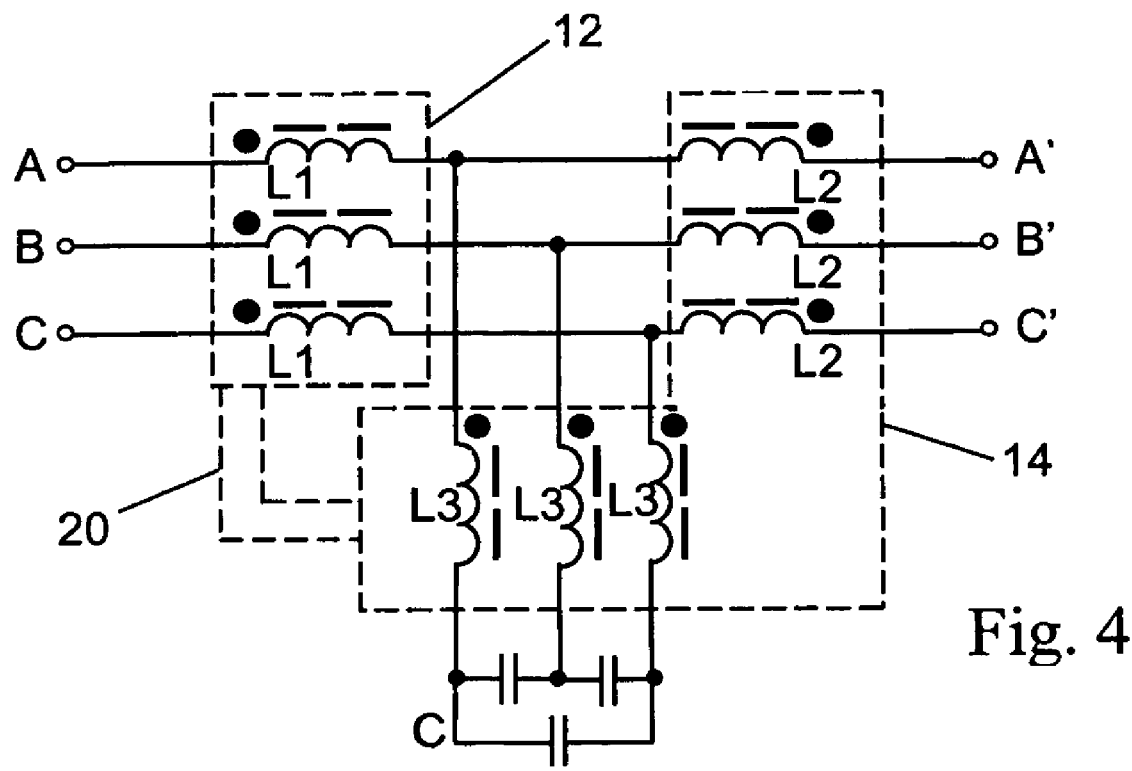
FIG. 4 is a schematic diagram of a further preferred three-phase embodiment of the invention on a magnetic core, with input windings disposed on one side of the magnetic shunt and the output windings and cross-link windings disposed on the other side of the magnetic shunt.
Figure 5:
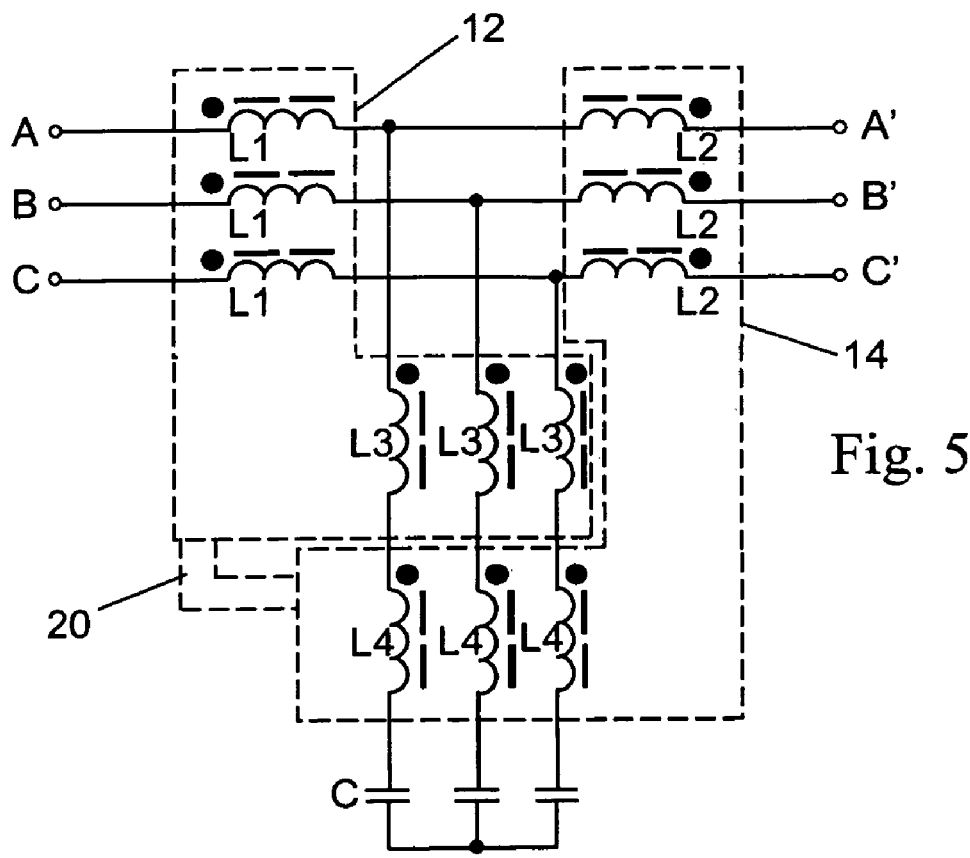
FIG. 5 is a schematic diagram of a further preferred three-phase embodiment of the invention having two windings in each phase of the cross-link circuit, with the input windings and one set of cross-link windings disposed on one side of the magnetic shunt and the output windings and the other set of cross-link windings disposed on the other side of the magnetic shunt.
Figure 6:
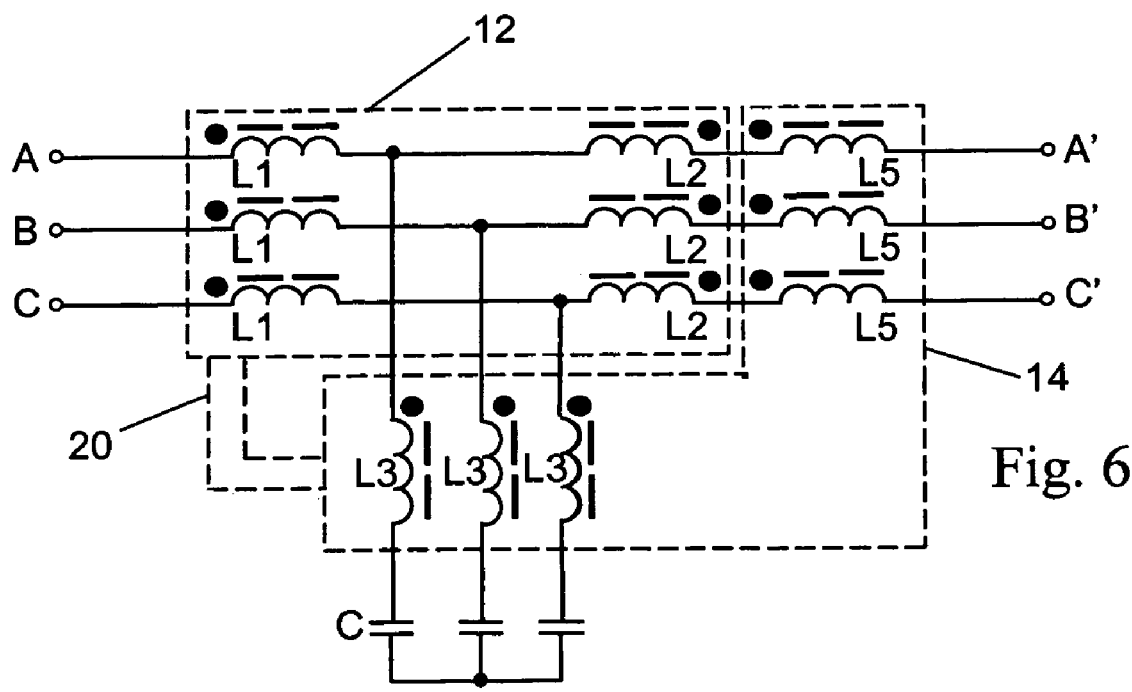
FIG. 6 is a schematic diagram of a further preferred three-phase embodiment of the invention having an output winding and a compensating winding in each phase of the output circuit, with the input windings and compensating windings disposed on one side of the magnetic shunt and the cross-link windings and output windings disposed on the other side of the magnetic shunt.

Many variations of the harmonic mitigating system are available using the principles of the invention. FIG. 4 illustrates an embodiment of the invention with input windings L1 disposed on the first part 12 of the core 10 and output windings L2 and cross-link windings L3 disposed on the second part 14 of the core 10. FIG. 5 illustrates an embodiment having two windings L3, L4 in each phase of the cross-link circuit, with the input windings L1 and one set of cross-link windings L3 disposed on the first part 12 of the core 10 and the output windings L2 and the other set of cross-link windings L4 disposed on the second part 14 of the core 10. FIG. 6 illustrates an embodiment of the invention having a compensating winding L5 in each phase of the output circuit, with the input windings L1 and compensating windings L5 disposed on the first part 12 of the core 10 and the cross-link windings L3 and output windings L2 disposed on the second part 14 of the core 10. In each case the polarities of the various windings are selected so that the net flux generated by the windings on one side of the magnetic shunt 20 (e.g. the first part 12 of the core 10) is in a direction opposite to the net flux generated by the windings on the other side of the shunt 20 (e.g. the second part 14 of the core 10).

Complete cancellation of harmonic currents generated by the line windings L1 and cross-link windings L3 is not possible, because these windings although magnetically coupled to the shunt are out of phase. However, substantial cancellation is possible with the selection of optimal winding characteristics and polarities.

FIGS. 7 and 8 illustrate embodiments of the invention in which the capacitors in the capacitor bank C of the cross-link circuit are connected line-to-line between the cross-link windings and the corresponding phases at the junction point between the input windings L1 and output windings L2, creating a parallel cross-link circuit for each phase between the input windings L1 and output windings L2.

As shown in FIGS. 9 to 13, there are many possible configurations of a core 10 according to the invention. In FIG. 9 a separate magnetic element forms the shunt 20, disposed between two "E" magnetic elements forming the first and second parts 12, 14 of the core 10. In FIG. 10 the two "E" magnetic elements forming the first and second parts 12, 14 of the core 10 are disposed in the same direction, the yoke of the first part 12 forming the shunt 20 while a separate magnetic element serves as a yoke to magnetically couple the core legs at the open side of the "E" element (shown at the top of FIG. 10). In FIG. 11 the two "E" magnetic elements forming the first and second parts 12, 14 of the core 10 are disposed in the same direction, the yoke of the second part 14 forming the shunt 20 while a separate magnetic element serves as a yoke to magnetically couple the core legs at the open side of the "E" element (shown at the bottom of FIG. 11). In each case it is preferable to provide non-magnetic gaps 24 (for example air gaps) between the shunt 20 and one of the parts 12, 14 of the core.

In FIG. 12 the first and second parts 12, 14 of the core 10 are formed from separate magnetic leg and yoke elements, and the shunt 20 is a separate magnetic element, with non-magnetic gaps 26 provided between elements. FIG. 13 shows an embodiment like FIG. 12, formed from separate magnetic leg and yoke elements with a shunt 20 also as a separate magnetic element, but with non-magnetic gaps 26 provided not only between elements, but also "distributed air gaps" at intermediate positions along the core legs.

Although the invention has been described in the context of a three-phase harmonic mitigating device, the principles of the invention apply also to a single phase harmonic mitigating device.

Various embodiments of the invention having been thus described by way of example only, it will be apparent to those skilled in the art that variations and adaptations may be made without departing from the scope of invention, as set out in the appended claims.

We claim:

1. A harmonic mitigating device for mitigating harmonic currents generated by a load having an input connected to a power distribution system and an output connected to the load, comprising a magnetic core having three core legs, each corresponding with one of three phases of the power distribution system, at least one magnetic shunt, extending across and magnetically coupled to the core legs at an intermediate part thereof, such that first and second parts of each core leg are separated from one another and disposed on either side of the shunt, for each phase, a first reactive element comprising a line winding having a first end for connection to a first line and a second end, the line winding being disposed on the first part of the core leg, for each phase, a second reactive element comprising a first cross-link winding, disposed on the second part of the core leg and having a first end connected to the second end of the line winding and a second end connected to a capacitor, the capacitor having a second end connected to a different phase or to a capacitor associated with a different phase, whereby the line winding and associated cross-link winding for each phase are magnetically coupled by the magnetic shunt.

2. The device of claim 1 in which the core is provided with at least one non-magnetic gap.

3. The device of claim 2 further comprising a third reactive element comprising a load winding having a first end for connection to the load and a second end connected to the first line through the line winding, disposed on the first part of the core.

4. The device of claim 3 further comprising a fourth reactive element comprising a compensating winding having a first end for connection to the load and a second end connected to the third reactive element, disposed on the second part of the core.

5. The device of claim 3 further comprising a second cross-link winding connected in series with the first cross-link winding, disposed on the first part of the core.

6. The device of claim 2 in which line winding and load winding are located on one magnetic core and the cross-link winding is located on another, separate, magnetic core magnetically connected to the first magnetic core and separated therefrom by a magnetic shunt.

7. The harmonic mitigating device of claim 1 wherein harmonic fluxes generated by the line winding and cross-link winding are in opposition and partly or fully cancel in the shunt.

8. A harmonic mitigating device for mitigating harmonic currents generated by a load having an input connected to a power distribution system and an output connected to the load, comprising a magnetic core having at least one core leg, the core comprising a first part and a second part at least one magnetic shunt, the first and second parts of each core leg being separated from one another and disposed on either side of the shunt, a first reactive element comprising a line winding having a first end for connection to a first line of a power supply and a second end, the line winding being disposed on the first part of the core leg, a second reactive element comprising a cross-link winding, disposed on the second part of the core leg and having a first end connected to the second end of the line winding and a second end connected to a capacitor, the capacitor having a second end connected to a second line of the power supply, whereby the line winding and associated cross-link winding are magnetically coupled by the magnetic shunt.

9. The device of claim 8 wherein harmonic fluxes generated by the line winding and cross-link winding are in opposition and partly or fully cancel in the shunt.

* * * * *